United States Patent [19]

Sword

[11] 3,770,295
[45] Nov. 6, 1973

[54] DUAL AXLE CONVERTIBLE BIKE

[76] Inventor: Gordon A. Sword, 9246 Foster Rd., Bellflower, Calif. 90706

[22] Filed: July 6, 1971

[21] Appl. No.: 159,711

[52] U.S. Cl. ............................... 280/229, 280/279
[51] Int. Cl. ............................................ B62m 9/08
[58] Field of Search .................. 280/229, 277, 279, 280/1.189, 1.180, 64, 80; 301/1, 5; 180/7

[56] References Cited

UNITED STATES PATENTS

| 423,051 | 3/1890 | Haven | 301/1 |
|---|---|---|---|
| 605,182 | 6/1898 | Johnston | 280/229 |
| 2,125,568 | 8/1938 | Huyssen et al. | 280/229 |
| 2,395,230 | 2/1946 | Lucas | 280/229 |
| 2,555,480 | 6/1951 | Fischer | 280/229 |
| 3,371,944 | 3/1968 | Daniels | 280/229 |

FOREIGN PATENTS OR APPLICATIONS

| 7,360 | 6/1886 | Great Britain | 280/229 |
|---|---|---|---|

Primary Examiner—Kenneth H. Betts
Assistant Examiner—J. M. McCormack
Attorney—Fulwider et al.

[57] ABSTRACT

A dual axle convertible bike including a bike frame for being carried on one end from a wheel having a central axle which has a first pair of mounting studs projecting from the opposite sides thereof. An eccentric axle is mounted from the wheel and is spaced from the central axle and includes a second pair of mounting studs projecting from the opposite sides thereof. A wide spaced fork is carried from the frame and is formed with a pair of downwardly projecting tines which include bosses on their respective lower extremities for selective receipt on the first and second pair of mounting studs and which are spaced apart along their intermediate portions a distance sufficient to clear the respective first and second pairs of studs when such bosses are mounted on the respective second and first pair of studs. Consequently, the fork may be mounted from the first pair of mounting studs to cause the bike to ride in a conventional manner and may be mounted from the second pair of mounting studs to cause the bike to reciprocate upwardly and downwardly when ridden to give the rider a pleasurable ride.

11 Claims, 8 Drawing Figures

PATENTED NOV 6 1973
3,770,295
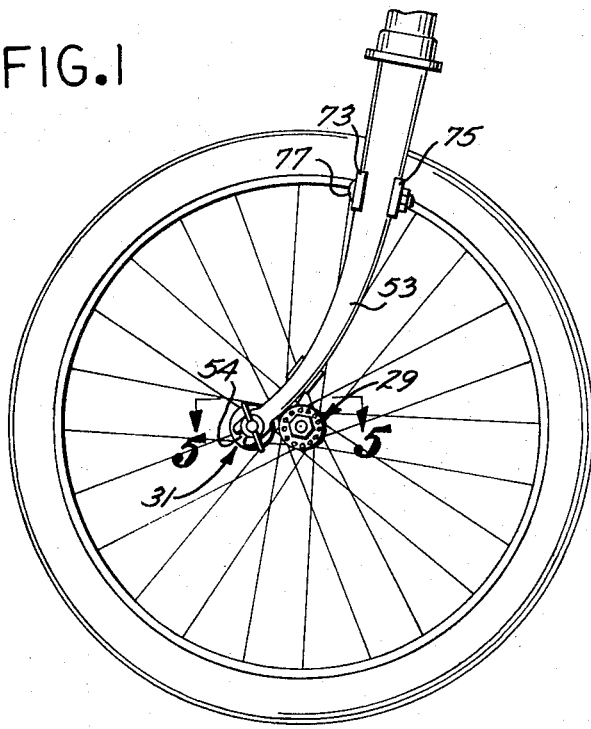
FIG.1
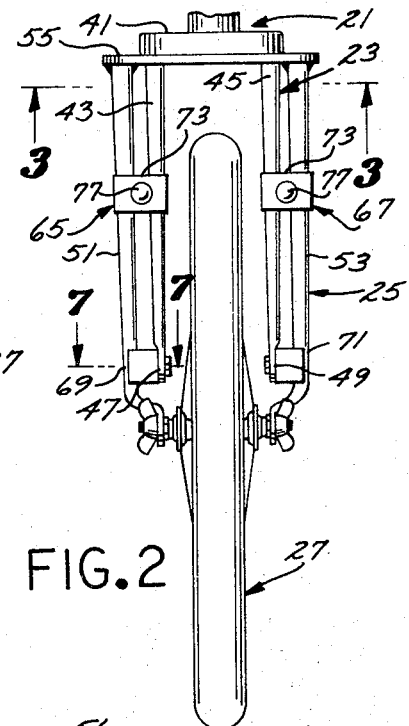
FIG.2
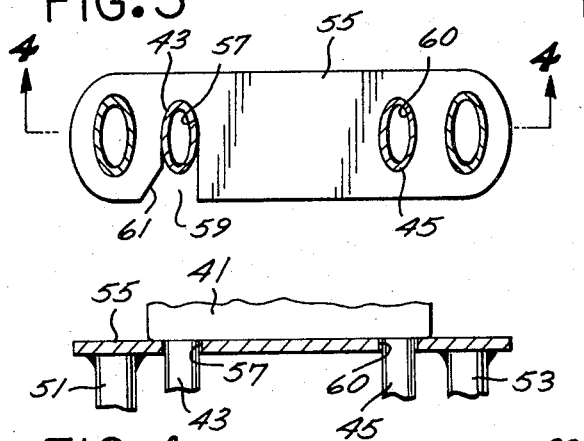
FIG.3
FIG.4
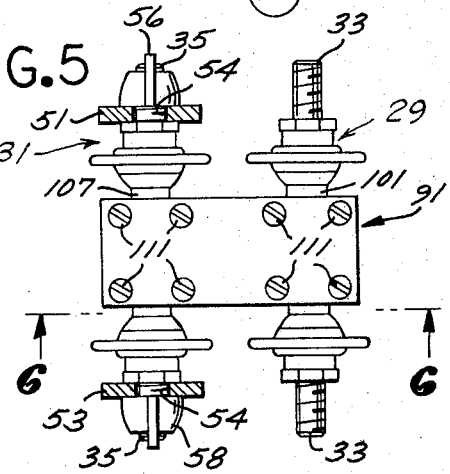
FIG.5
FIG.7
FIG.6
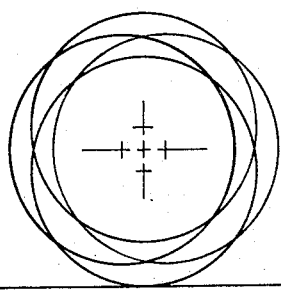
FIG.8
INVENTOR.
GORDON A. SWORD
BY *Fulwider, Patton, Rieber,
Lee and Utecht*
ATTORNEYS

DUAL AXLE CONVERTIBLE BIKE

BACKGROUND OF THE INVENTION

1. Field of the Invention

The present invention relates to a bike which may be converted to produce a reciprocating, or bucking, action when ridden.

2. Description of the Prior Art

Numerous efforts have been made to provide a bicycle which will produce a rhythmic reciprocating, or bucking, action when ridden to thereby give a pleasurable feeling of motion. Specially designed bikes have been proposed which include rather complicated wheel axles that are adjustable to a number of different positions. Bicycles of this type are shown in U.S. Pat. Nos. 605,182 and 3,371,944. Bicycles of this type suffer the shortcoming that they are relatively expensive to manufacture thereby dictating a prohibitively high purchase price.

SUMMARY OF THE INVENTION

The present invention is characterized by a bicycle having at least one wheel which includes both central and eccentric axles having respective first and second pairs of mounting studs projecting from the opposite sides thereof. A fork is formed to be selectively connected on its lower extremities with such mounting studs and is formed with tines spaced sufficiently far apart in their intermediate portions to clear the mounting studs of the unused axle whereby the fork may be mounted from the central axle to cause the bicycle to ride in a conventional manner and may be connected to the eccentric axle to cause the bicycle to reciprocate and produce a bucking action when ridden.

The objects and advantages of the present invention will become apparent from a consideration of the following detailed description when taken in conjunction with the accompanying drawings.

DESCRIPTION OF THE DRAWING

FIG. 1 is a partial side view of a dual axle convertible bike embodying the present invention;

FIG. 2 is a front view of the dual axle convertible bike shown in FIG. 1;

FIG. 3 is a horizontal sectional view, in enlarged scale, taken along the line 3—3 of FIG. 2;

FIG. 4 is a vertical sectional view taken along the line 4—4 of FIG. 3;

FIG. 5 is a horizontal sectional view, in enlarged scale, taken along the line 5—5 of FIG. 1;

FIG. 6 is a vertical sectional view taken along the line 6—6 of FIG. 5;

FIG. 7 is a horizontal sectional view, in enlarged scale, taken along the line 7—7 of FIG. 2; and FIG. 8 is a diagrammatic view depicting the motion of the front wheel of the bicycle shown in FIG. 1 as the bicycle is ridden.

DESCRIPTION OF THE PREFERRED EMBODIMENT

The dual axle convertible bicycle of present invention includes, generally, a bicycle frame 21 having a conventional fork 23 from which a wide spaced fork 25 is supported. Still speaking generally, a conventional bicycle wheel 27 is provided for carrying the fork 25 and includes a conventional central axle 29 having an eccentric axle 31 mounted therefrom. Referring to FIG. 5, the central and eccentric axles 29 and 31 include respective first and second pairs of oppositely projecting mounting studs 33 and 35 formed by opposite ends of the respective axle shafts for receipt of the lower extremities of the fork 25, with the intermediate portions of the tines of such fork being spaced apart a distance sufficient to clear the first set of studs 33 when such fork is mounted on the second set of studs 35 and vice versa. Consequently, the dual axle bicycle of present invention can conveniently be converted to a bicycle that rides in a conventional manner by merely mounting the fork 25 on the central axle 29 or to a bucking bike that produces a smooth reciprocating motion by mounting the fork 25 on the eccentric axle 31. The wheel 27 is a conventional spoked bicycle wheel and includes an array of spokes radiating outwardly from the opposite ends of the central axle 29 to be attached at their outer extremities to the rim of such wheel. The eccentric axle 31 is conveniently received with its axial dimension extending between such arrays of spokes and the studs 35 thereof project axially outwardly between adjacent spokes of such arrays.

The conventional bicycle fork 23 is formed with the horizontally projecting yoke 41 having a pair of downwardly projecting tines 43 and 45 projecting from the opposite ends thereof. The conventional tines 43 and 45 project parallel to one another as viewed from the front (FIG. 2) and terminate at their lower extremities in respective mounting bosses 47 and 49 which normally receive the conventional mounting studs 33 of the conventional axle 29.

The wide spaced fork 25 and associated paraphernalia is preferably provided in kit form for convenient attachment to a conventional bicycle frame 21. The fork 25 includes a pair of downwardly projecting tines 51 and 53 which are carried on their upper extremities from the opposite ends of a flat plate which defines a wide spaced fork yoke 55. The tines are formed in their lower extremities with respective downwardly opening slots which form bosses 54 for receipt of the mounting studs 33 and 35. A pair of wing nuts 56 and 58 (FIG. 5) are provided for screwing onto the mounting studs 33 and 35 to hold the fork on the axle 29 or 31 selected.

Referring to FIG. 3, the wide spaced fork yoke 25 includes a first opening 60 which telescopically receives the close spaced fork tine 45 and entirely encloses such tine and a second opening 57 which opens to the rear to form a keyway 59 for receipt of the other close spaced fork tine 43. The keyway 59 is formed on one side with an outwardly angled flare 61 for leading the tine 43 into such keyway.

The wide spaced fork 25 is mounted from the conventional narrow spaced fork 23 by means of a pair of mounting clamps, generally designated 65 and 67, (FIG. 2) and a pair of spacer blocks 69 and 71. The mounting clamps 65 and 67 are each in the form of a pair of clamping plates 73 and 75 (FIG. 1) disposed on opposite sides of respective pairs of the respective right and left hand tines 43 and 51 and 45 and 53 and are clamped together by means of respective nut and bolt assemblies 77. The spacer blocks 69 and 71 are preferably formed in their outer extremities with semicircular cutouts 81 (FIG. 7) for receipt of the respective wide spaced tines 51 and 53 and are formed in their opposite extremities with respective axial threaded bores 83 for receipt of respective mounting studs 85, such mounting studs being received in the conventional downwardly opening slots, or bosses 87, of the close spaced tines 43 and 45.

The eccentric axle 31 is mounted from the central axle 29 by means of a mounting block assembly, generally designated 91 (FIG. 5), such mounting block assembly being formed by a pair of radially projecting mounting blocks 93 and 95 (FIG. 6). The mounting blocks 93 and 95 are formed on their one extremity with confronting serrated semi-circular cutouts 97 and 99 for receipt of the central axle hub 101 and on their opposite extremities with respective confronting semi-circular cutouts 103 and 105 for receipt of the eccentric axle hub 107. In the preferred embodiment the axles 29 and 31 are spaced apart about 2 ½ inches. The mounting block assembly 91 is conveniently received between the spokes secured to the opposite ends of the central hub 29. The block 93 is formed with a plurality of through bores which are aligned with threaded bores in the block 95 for receipt of respective mounting studs 111 which firmly clamp the mounting block assembly onto the respective central and eccentric hubs 101 and 107.

In operation, the wide spaced fork 25, eccentric hub 31, respective mounting clamps and spacers and wing nuts 65, 67, 69, 71, 56 and 58 may be sold in kit form and may be assembled on a conventional bicycle 21. For such assembly the mounting nuts (not shown) are removed from the mounting studs 33 of the central axle 29 of the bicycle wheel 27 and such wheel removed from the bicycle fork 23. The wide spaced fork 25 is then moved into position by feeding the left tine 45 into the opening 60 (FIG. 3) and telescoping the wide fork plate 55 upwardly over such with such yoke 25 rotated slightly clockwise from the position shown in FIG. 3 to avoid registration of the tine 43 with the keyway opening 59. This maneuver is necessary for bicycle forks 23 which include tines 43 and 45 which are curved slightly with respect to one another as viewed from the front view shown in FIG. 2. When the wide spaced fork yoke 55 is engaged beneath the close spaced fork yoke 41 as shown in FIG. 2, the wide spaced fork 25 may be rotated slightly counterclockwise to the position shown in FIG. 3 to register the tine 43 with the keyway opening 59 and align the wide spaced tines 51 and 53 in the same transverse plane as the close spaced tines 43 and 45. The spacer blocks 69 and 71 are then fitted between the respective right and left hand tines 51 and 43 and 45 and 53 and mounted from the close spaced tines 43 and 45 by inserting the mounting studs 85 as shown in FIG. 7. The mounting clamp assemblies 65 and 67 are then clamped over the respective tines 53 and 43 and 25 and 55.

The eccentric axle 31 is mounted on the wheel 27 by inserting such axle between the spokes connected to opposite ends of the central axle 29 and projecting the mounting studs 35 thereof through openings formed between spokes on the same side of such wheel. The clamp blocks 93 and 95 are then positioned on opposite sides of the respective hubs 101 and 107 of the respective axles 29 and 31 and brought into clamping position with such hubs received in the respective semi-circular cutouts 97, 99, 103 and 105. The mounting screws 111 are then inserted and tightened down to secure the mounting block device 91 securely to the respective axles 29 and 31.

The wide spaced fork 25 may then be mounted directly on the eccentric axle 31 and the wing nuts 56 and 58 (FIGS. 1 and 5) screwed onto the mounting studs 35 to hold the fork securely on the axle 31. The rider may then mount the bicycle and upon peddling thereof, the eccentric axle 31 will rotate about the central axle 29 to thereby impart a reciprocating motion to the front of the bicycle with an upward and downward travel of approximately 5 inches. It has been found that such action provides a high degree of entertainment for youngsters. The wide spacing of the tines 51 and 53 enables the central axle mounting studs 33 to pass thereby without engagement therewith.

When the bicycle is to be ridden as a conventional bicycle, the youngster may unscrew the wing nuts 56 and 58 and dismount the wide spaced fork 25 from the eccentric axle 31 and remount it on the conventional central axle 29 and screw the wing nuts 56 and 58 onto the central axle studs 33. This conversion may be made relatively rapidly by a youngster without the assistance of an adult. The bicycle is then ready to be ridden as a conventional bicycle and rotation of the front wheel 27 will cause the eccentric axle 31 to follow a path having a radius of approximately 2 ½ inches from the central axle 29 and the wide spacing of the tines 51 and 53 of the fork 25 will enable the eccentric axle mounting studs 35 to pass between such tines without engagement therewith. This feature is particularly important to avoid the necessity of removing the bearings and axle shafts from the hubs 101 and 107 of the axles 29 or 31 which is not in use.

From the foregoing it will be apparent that the dual axle convertible bike of present invention provides a relatively inexpensive and convenient means for converting a conventional bike to a bicycle which will produce a reciprocating or bucking action when ridden and which may be conveniently be re-converted for riding as a conventional bike.

Various modifications and changes may be made with regard to the foregoing detailed description without departing from the spirit of the present invention.

I claim:

1. An improved dual axle convertible reciprocating bike comprising:

a bike frame;

a bike wheel including a central axle formed with a first pair of oppositely projecting mounting studs, said wheel further including first and second arrays of spokes spanning radially outwardly from opposite axial ends of said axle;

an eccentric axle spaced from said central axle and disposed between said arrays of spokes, said eccentric axle being further formed with a second pair of oppositely projecting studs extending between adjacent spokes of said arrays;

axle mounting means for mounting said eccentric axle from said wheel; and wide spaced fork means mounted from said frame and formed with a pair of downwardly projecting tine means which are formed in their lower extremities with a first pair of mounting bosses for selective receipt of said first and second pairs of mounting studs, said tine means being spaced apart in their intermediate portions a distance sufficient to clear said first and second pair of studs when said bosses are selectively secured to said respective second and first pairs of axles, said fork and tine means further being of sufficient length to accommodate the eccentricity of said wheel when said second pair of studs are received in said bosses whereby said fork may be mounted on said central axle to cause said bike to ride in a conventional manner and may be mounted on said eccentric axle to cause said bike to reciprocate upwardly and downwardly when ridden.

2. A reciprocating bike conversion kit for attaching the fork of a bike to a conventional spoked wheel having arrays of spokes radiating outwardly from opposite ends of the central axle and comprising:

a conventional bike wheel axle substantially identical to said central axle for disposition between said array of spokes at a point offset from said central axle to form an eccentric axle;

mounting means affixing said eccentric axle from said central axle for travel with said wheel about said central axle;

conversion tine means for attachment to the fork of said bike including bosses at the lower extremities thereof for mounting on the studs of said eccentric axle, said tine means being spaced apart in their intermediate portion a distance sufficient to accommodate passage therebetween of said central axle when said wheel rotates; and tine mounting means for mounting said tine means from said fork whereby said eccentric axle may be mounted between said array of spokes and said bosses received on said eccentric axle so said bike may be ridden as a reciprocating bike.

3. A dual axle convertible bike as set forth in claim 1 wherein:

said mounting means includes a mounting bracket for clamping on one end to said central axle and on its opposite end to said eccentric axle.

4. A dual axle convertible bike as set forth in claim 1 wherein:

said bike frame includes a conventional close spaced fork having a pair of downwardly projecting tines which are spaced apart a distance insufficient to clear said mounting studs; and said wide spaced fork is in the form of a conversion fork including fork mounting means for mounting said wide spaced fork to said frame whereby said conversion fork may be utilized to convert a conventional bike to an eccentric axle bike.

5. A dual axle convertible bike as set forth in claim 4 wherein:

said fork mounting means includes clamping means for clamping said wide spaced fork directly to said close spaced fork.

6. A dual axle convertible bike as set forth in claim 4 wherein:

said wide spaced fork is formed in its upper extremity with a yoke having a pair of openings therein for receipt therethrough of said tines of said narrow spaced fork.

7. A dual axle convertible bike as set forth in claim 4 wherein:

said fork mounting means includes a pair of spacers interposed between the lower extremities of the tines of said close spaced fork and the tines of said conventional fork and including respective fastners for fastening said spacers to said tines of said close spaced fork.

8. A dual axle convertible bike as set forth in claim 4 wherein:

said close spaced fork is formed in its upper extremity with a horizontally extending first yoke; and said wide spaced fork is formed in its upper extremity with a yoke formed with openings therein for receipt of the tines of said close spaced fork and engaged with the underside of said yoke of said close spaced fork.

9. A dual axle convertible bike as set forth in claim 5 wherein:

said fork mounting means includes a pair of spacers for being interposed between the lower extremities of the tines of said close spaced fork and the tines of said wide spaced fork and including respective fasteners for fastening said spacers to said respective tines of said close spaced fork.

10. Dual axle convertible bike as set forth in claim 6 wherein:

one of said openings totally encircles one of said tines of said close spaced fork and the other of said openings is open on one side for passage through said open side of the other of said tines of said close spaced fork.

11. Dual axle convertible bike as set forth in claim 7 wherein:

said spacers are formed in one side with depressions for receipt of said tines of said close spaced fork.

* * * * *